United States Patent [19]
Whittaker et al.

[11] Patent Number: 5,640,531
[45] Date of Patent: Jun. 17, 1997

[54] ENHANCED COMPUTER OPERATIONAL SYSTEM USING AUXILIARY MINI-CACHE FOR ENHANCEMENT TO GENERAL CACHE

[75] Inventors: Bruce Ernest Whittaker; Leland Elvis Watson, both of Mission Viejo, Calif.

[73] Assignee: Unisys Corporation, Blue Bell, Pa.

[21] Appl. No.: 587,701

[22] Filed: Jan. 16, 1996

Related U.S. Application Data

[63] Continuation of Ser. No. 81,048, Jun. 22, 1993.

[51] Int. Cl.⁶ .................... G06F 12/00; G06F 13/00
[52] U.S. Cl. .................. 395/445; 364/DIG. 1; 364/DIG. 2; 364/243.41; 364/243.44; 364/245.31; 395/446
[58] Field of Search .................. 364/DIG. 1, DIG. 2, 364/243.41, 243.44, 245.31; 395/403, 444, 445, 446, 468, 472, 481, 490

[56] References Cited

U.S. PATENT DOCUMENTS

| | | | |
|---|---|---|---|
| 3,970,999 | 7/1976 | Elward | 340/172.5 |
| 4,386,399 | 5/1983 | Rasala et al. | 395/425 |
| 4,731,738 | 3/1988 | Fisher et al. | 395/425 |
| 5,058,006 | 10/1991 | Durdan et al. | 395/425 |
| 5,113,510 | 5/1992 | Hillis | 395/425 |
| 5,117,395 | 5/1992 | Hashimoto | 365/221 |
| 5,136,700 | 8/1992 | Thacker | 395/400 |
| 5,233,702 | 8/1993 | Emma et al. | 395/445 |
| 5,305,446 | 4/1994 | Leach et al. | 395/425 |
| 5,307,477 | 4/1994 | Taylor et al. | 395/425 |
| 5,313,605 | 5/1994 | Huck et al. | 395/403 |
| 5,345,576 | 9/1994 | Lee et al. | 395/308 |
| 5,357,621 | 10/1994 | Cox | 395/425 |
| 5,369,753 | 11/1994 | Tipley | 395/425 |
| 5,450,563 | 9/1995 | Gregor | 395/403 |

Primary Examiner—Tod R. Swann
Assistant Examiner—Tuan V. Thai
Attorney, Agent, or Firm—Alfred W. Kozak; Mark T. Starr; Steven R. Petersen

[57] ABSTRACT

An enhanced computer system architecture provides a processor supported by a general cache and a mini-cache wherein the mini-cache will supply requested data words not available in the general cache thus eliminating the extra clock periods necessary to access main memory. The mini-cache stores frequently used data words and is refilled concurrently during processor command execution and is settable for handling data words or code words or both. A data queue storage stores a block of words which duplicate words in main memory. If the requested address matches an address register block in the mini-cache, the data queue store will make the words in the data queue available to requests from the processor. The mini-cache also monitors the system bus for any "write" operations which might change the validity of the data in the address register block of the mini-cache. In this case, the data stored in the mini-cache is invalidated and cannot be used by the processor. Additionally, the mini-cache can be added to or removed from system operations.

10 Claims, 7 Drawing Sheets

(MINI-CACHE WITH NORMAL CACHE)

(MINI-CACHE WITHOUT NORMAL CACHE)

ENHANCED COMPUTER OPERATIONAL SYSTEM USING AUXILIARY MINI-CACHE FOR ENHANCEMENT TO GENERAL CACHE

This is a continuation of co-pending application Ser. No. 08/081,048 filed on Jun. 22, 1993.

FIELD OF THE INVENTION

This disclosure relates to systems for decreasing the average access time for memory access by a processor with the use of cache memory units.

CROSS REFERENCES TO RELATED APPLICATIONS

This application is generally related to the type of computer systems described in a co-pending application U.S. Ser. No. 08/019,003 entitled "Synchronous Dual Bus System for Store-through and Non-store-through Cache Memories in Multiple Processor Networks". It is also related to a co-pending application U.S. Ser. No. 08/080,861 entitled "Mini-Cache Operational Module". This application is also related to U.S. Pat. No. 5,404,462 entitled "Dual Bus Interface Transfer System for Central Processing Module" which describes an interface between a processor and dual system busses, such as the interface used in this disclosure.

BACKGROUND OF THE INVENTION

As seen in FIG. 5 there is shown the basic diagram of a central processing module 5 having a processor 10 which interfaces with a system memory module 40 by means of a dual system bus 22 having system busses 22a and 22b. Other system modules 30 may share the system bus and these may include not only additional central processing modules, but also input/output processors and a maintenance subsystem. Additionally there can be a second identical system bus 22b which is used to increase the system bandpass as shown in the dotted bus lines of FIG. 5. This type of system is typical to that of the Unisys A-11 computer system described in the aforementioned U.S. Ser. No. 08/019,003 entitled "Dual Bus System Operations Network".

Each of the features to be described herein would apply equally to a single bus system or a dual bus system. In a dual bus system, the accessing modules described herein would be able to access either bus as that bus is available. However, for simplicity of discussion, the following disclosure will view the situation of a single bus situation.

Typical of the Unisys A-11 system is a "E-Mode" designated protocol which transfers data on the basis of blocks of four related data words. For example, each word may be a word of 60-bits wherein 52 bits are information data, 7-bits are parity data and 1-bit indicates data corruption.

In a typical situation with a mix of typical system operating software, the processor 10 of FIG. 5 may, on the average, function to require memory accesses about every five clock times of processor operations, that is to say, the processor will execute processing operations for five clocks, then access memory, then process operations for five clocks and then access memory on an average basis. During the "memory access" times, the processor 10 must, of course, wait until the memory function in the main system memory 40 has provided the next data word or the next instruction code word before the processor can proceed with continuing its processing operations.

One recurring problem in digital system design is how to speed up throughput and reduce delaying processor access to memory data and instructions. FIG. 6 is a drawing which indicates the "processor/access cycle" time which is designated as $T_{ap}$. This time period $T_{ap}$ is made up of the processing time, $t_p$, plus the access time, $t_a$.

The performance of the system, of course, is dependent on the best speed of access to memory data and thus is an "inverse function" of the processor/access time, $T_{ap}$. Thus if this time period, or either of its sub-elements $t_p$, or $t_a$ can be reduced, then the system performance can be increased accordingly.

The presently described mini-cache throughput enhancement system deals with methods and architecture for reducing the average memory access time, $t_a$. It may be noted that the access time may involve several elements which include:

(i) the time for bus arbitration and access grant required;

(ii) the system bus protocols used; and, (iii) the memory module 40 Read cycle time.

The memory module Read-cycle time, item (iii), is the most significant element and is the focus of the presently described system.

One technique to reduce the memory cycle time is the standard technique of using a general cache memory module 14 as seen in FIG. 4. Thus, as seen in FIG. 4, there is provided the insertion of a general cache memory module 14 between the central processing module with its processor 10 and the system bus 22 which provides a channel to and from the main memory 40.

A cache memory module such as the general cache of 14 of FIG. 4 is made up of a very high speed fast memory cycle, fast data access cycle of operation but it also involves very expensive types of storage units such as RAMs.

The size of the cache units such as cache memory 14 is generally much smaller in addressability than the main system memory 40. However, since processing most often is sequential or repetitive in nature, the algorithms for cache designs have already been derived for filling the cache memory with data words that the processor 10 is most "likely" to need on its next operation or within the next few operations.

The "access time" between the processor 10 and the cache memory 14 is much faster than that which would be required to access main memory. Often, cache cycles are as quick as a single clock time period.

By using the appropriate cache hardware design algorithms, appropriate cache structure and cache size, the average "cache hit" rates may be as high as 80% to 90%, that is to say, that 80% to 90% of the time, the cache memory 14 already contains the data word which is needed by the processor 10.

FIG. 4 shows a generalized system where a central processing module 5 having a processor 10 communicates through an internal bus 12 to a general cache memory 14 which provides communication on a system bus 22 to the main system memory 40. This is a typically used system in order to enhance the data access time for the processor which will enhance throughput of the system.

FIG. 5 shows a generalized system diagram where a central processing module 5 having a processor 10 can communicate over a system bus 22 to the main system memory 40. Additionally, other system modules such as input/output modules, other central processing modules, and other digital units designated by the block 30 may also communicate over the system bus to access main memory. Thus at times, there will be contention for main memory between the processor 10 and the other system modules 30. Further, if one of the other system modules 30 is writing data on the system bus into main memory, then it is possible that the data in a cache memory unit could be invalid and not usable by the processor 10 in certain situations. Thus the presently described mini-cache, FIGS. 1 and 2, has an invalidation block unit 28 which prevents the processor from accessing data in the mini-cache 14$i$ when it is discovered that the system bus is writing new data into the main system memory 40. This will later be described in connection with the mini-cache of FIG. 2.

While better system performance value is seen from the addition of a cache memory module such as cache memory 14, it should be indicated that this gain comes at a considerable system cost in money and hardware and PC board real estate. Thus it is possible also to eliminate the general cache and substitute a less costly mini-cache in certain instances.

The presently described system and architecture provides a considerable improvement in access time and throughput by use of the described mini cache alone or the mini cache in combination with a general cache memory unit.

SUMMARY OF THE INVENTION

A computer system using a general cache memory is enhanced by the use of an auxiliary mini-cache available to a processor. A mini-cache unit is added to a computer system structure to interface between the processor and main memory or to interface between a general cache memory and the system main memory.

The mini-cache provides a data queue block which holds frequently used (or the most likely used) data words required by the processor. An address register block holds the address values of each of the data words in the data queue block. A hit control block compares the processor's data address requests with those in the mini-cache and if a "hit" occurs, will cause a Queue Steering Block to select the appropriate data in a data register and transfer it immediately to the processor 10. An invalidation block module monitors the system bus for memory type operations that may be in progress and if an address value held in the mini-cache address register is the same as the address value on the system bus, then the invalidation block will mark the mini-cache address value as invalid since possibly new Write data may be in progress to change the validity of the data in the data queue block which was derived from the main memory module which is now undergoing change.

Absent the invalidation situation, the hit control block will prevent execution of any system bus request to main memory in order that the data residing in the mini-cache can be immediately provided to the processor. Additionally, the mini-cache provides a maintenance block which is used to configure modes of operation for the mini-cache in order to differentiate between information data and instruction code data or whether the mini-cache is to be enabled or disabled.

DESCRIPTION OF PREFERRED EMBODIMENT

Figure 1:
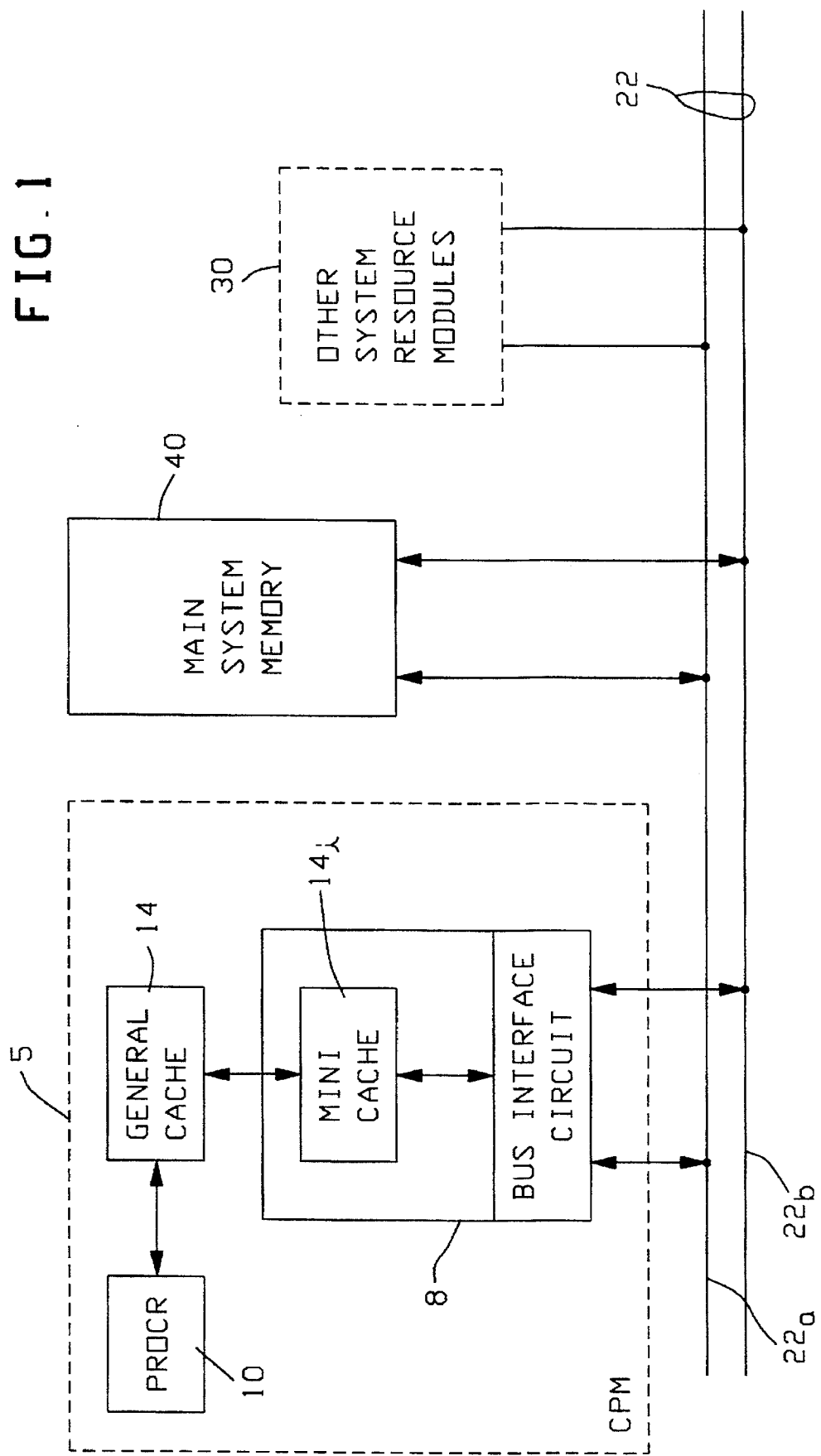
FIG. 1 is a generalized block diagram of a computer system with its processor having a general cache and an auxiliary mini-cache.

FIG. 1 shows a diagram of the enhanced computer system where a central processing module 5 holds a processor 10 having a general cache memory 14. Communicating with the general cache 14 is an auxiliary mini-cache 14$_i$ which supports the general cache and which operates through a bus interface circuit 8 to a system bus means 22. The system bus means may operate as a single bus channel or as dual busses 22$_a$, 22$_b$. Attached to the system bus means 22 is the main system memory 40 and a resource module block 30 which represents other modules on the system bus, such as peripheral controllers, other processors, I/O subsystem or other digital modules.

Figure 2:
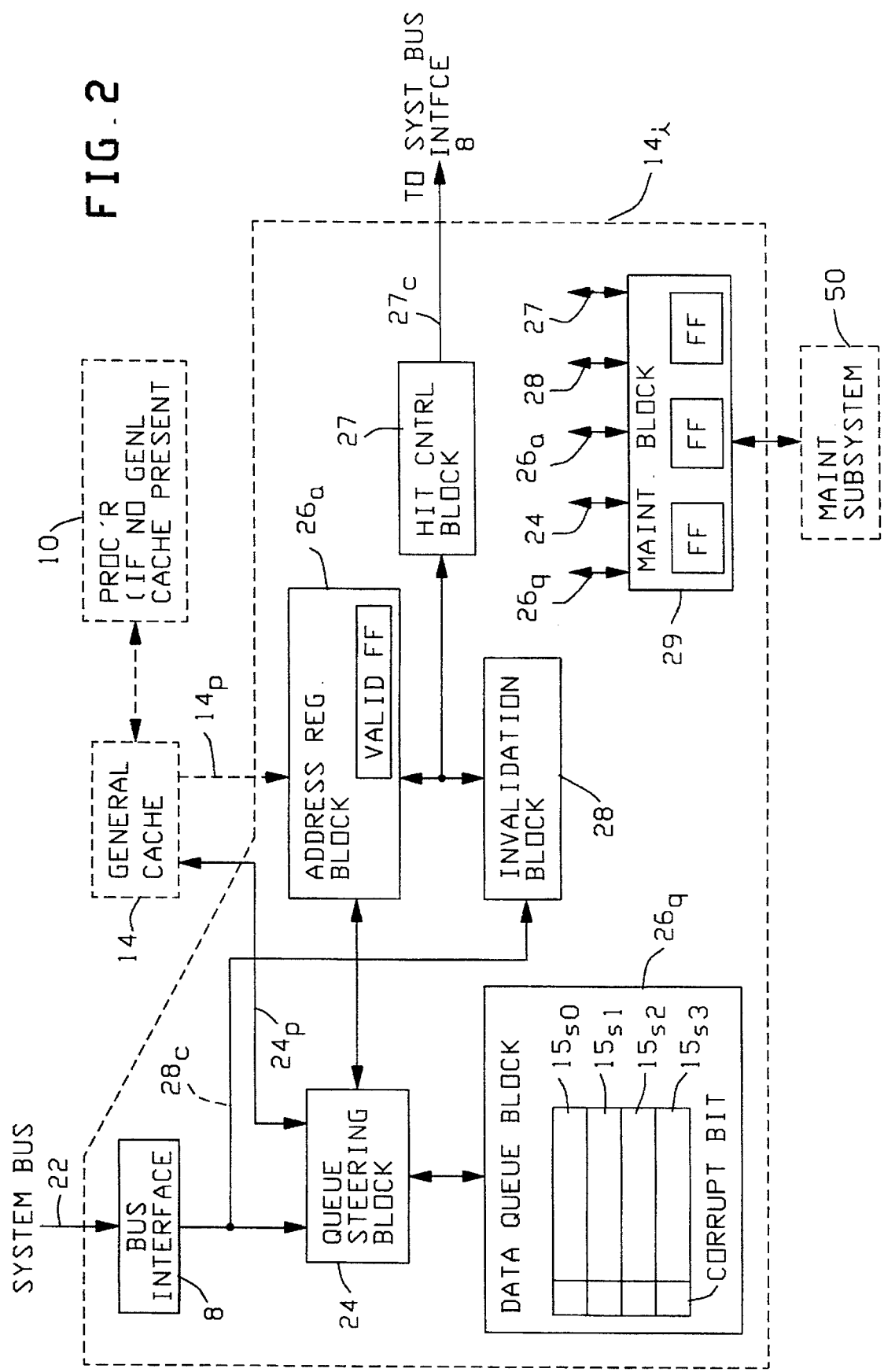
FIG. 2 is a block diagram of the auxiliary mini-cache.

FIG. 2 shows a block diagram of the functional elements of the presently described mini-cache system architecture. The mini-cache 14$_i$ shown in FIG. 2 is seen to have an input from the system bus 22 which can be connected to main memory and/or other units such as I/O subsystem 30. Additionally, the output from the mini-cache is seen to be presented to the processor 10 through the general cache 14.

The mini-cache 14$_i$ operates in a system which provides a number of modules developing different functions. FIG. 2 shows the various functional blocks as the queue steering block 24, the Data Queue block 26$_q$, the address register block 26$a$, the hit control block 27, the invalidation block 28, and the maintenance block 29.

The queue steering block 24 receives data blocks from memory 40 via bus interface 8 from the system bus 22. Steering block 24 also routes the data queue block 269 to general cache 14 or processor 10 directly, if no general cache is used. The steering block 24 also provides bidirectional connection with Data Queue Block 26$_q$.

If the mini-cache structure were not present or if the mini-cache were disabled by the maintenance subsystem 50, then the processor 10 and the general cache memory 14 would connect directly to the system bus through a system bus interface 8. This interface 8 would be typical to that described in a co-pending application Ser. No. 963,304 entitled "Dual Bus Interface Transfer System For Central Processing Module," now U.S. Pat. No. 5,404,462. On the other hand, if the mini-cache unit 14$_i$ is present and enabled, then the mini-cache will interface to the system bus interface circuitry 8.

Referring to FIG. 2, the basic logical blocks which provide the functions for the mini-cache 14$_i$ are shown in block diagram form. The Data Queue Block 26$_q$ is seen to contain four identical 60-bit registers. These registers (15$_{sx}$) are designated as 15$_{s0}$, 15$_{s1}$, 15$_{s2}$, and 15$_{s3}$. Each of these registers can carry 60 bits of which there are 52 bits of data, 7 bits of parity upon the data and 1 bit indicating whether or not that particular data word is "corrupted" that is to say no longer usable because of errors or invalidation.

The Data Queue Block $26_q$ and the Queue Steering Block 24 are present in the gate array chip logic whether the mini-cache $14_i$ is used or not. Thus the mini-cache function comes virtually free of additive circuitry.

The Queue Steering Block 24 works to direct which one of the four data queue registers $15_{sx}$ is to be loaded with data from the system bus 22. This block 24 also steers the output of the appropriate register 15 over to the processor 10.

The Address Register Block $26_a$ is circuitry which is loaded by the current processor memory address in order to hold this particular address value either until a new address is loaded or until the mini-cache address is invalidated.

The Hit Control Block 27 is used to monitor the processor's data address request and to compare this with the currently held address values in the address register block $26_a$. If a true comparison or "match" occurs and if the chosen Data Queue Register 15 is not marked as "corrupted", then the hit control block 27 will specify that a mini-cache "hit" has occurred. This will cause the Queue Steering Block 24 to select the appropriate data register from the data queue block $26_q$ and transfer this data immediately to the processor 10. Additionally, the hit control block 27 acts during the "hit" indication to prevent the system bus interface circuitry 8 (FIG. 1) from initiating a system bus memory operation.

Referring to FIG. 2, the invalidation block 28 will monitor the system bus interface 8 to see if any main memory type operations may be in progress. These main memory operations may be initiated by any system resource module 30 such as another processor in the system, various system input/output modules and so on.

If the system operation is an "invalidation type" of operation, that is to say an operation where data is being written to main memory thus to change old memory data, and if the invalidation block detects that the address value held in the address register $26_a$ is the same (match) as the address value presented on the system bus 22, then this will constitute a "invalidation condition" occurring. The invalidation block then will mark the particular mini-cache address value in $26_a$ as being "invalid". Thus, no more mini-cache "hits" can occur for this particular address until a new address value from the forwarding processor is loaded into the mini-cache $14_i$ on some subsequent memory Read operation.

In FIG. 2, the maintenance block 29 represents the final module of the mini-cache $14_i$ and includes a series of flip-flops which are set by the maintenance subsystem 50. This block, being controlled by an external maintenance subsystem 50, is configured for various mini-cache modes of operation. These modes of operation include:

(a1) ENABLED FLIP-FLOP-ON:—The mini-cache $14_i$ is operational when set by Maintenance Block 29. In this condition, a mini-cache hit acts to prevent a system bus operation.

(a2) DISABLED FLIP-FLOP-OFF:—The mini-cache $14_i$ is off-line, and no mini-cache operations occur.

(b1) DATA FLIP-FLOP-ON:—When set "on" in the Maintenance Block 29 by the Maintenance Subsystem 50, the mini-cache allows "Processor Read Data" commands to fill the Data Queue $26_q$ and to generate "Hit" signals.

(b2) DATA FLIP-FLOP-OFF:—When set "off" by Maintenance Subsystem 50, the mini-cache $14_i$ will not respond to "Processor Read Data" commands.

(c1) CODE FLIP-FLOP-ON:—When set "on" by the Maintenance Subsystem 50, the mini-cache $14_1$ permits "Processor Read Code" commands to fill the Data Queue $26_q$ and to generate "Hit" signals.

(c2) CODE FLIP-FLOP-OFF:—When this FF is "off" the mini-cache $14_i$ will not respond to "Processor Read Code" commands.

The DATA flip-flop and the CODE flip-flop can be both set "on" concurrently or can be individually set "on" or "off" separately.

It may be observed that the various components of mini-cache $14_i$ such as the data queue $26g$, the address register $26a$, the queue steering block 24, are made of "normally required" logic even absent the concept of a mini-cache for present usage. The data queue $26_q$ receives, synchronizes and holds data captured from the system bus 22 for the use of the processor 10. The address register $26a$ holds the current operating address and is useful and necessary for processor diagnostics and testing. The queue steering block 24 directs the stored data for transfer to the processor 10. Thus, the mini-cache is virtually provided free of additional hardware costs since most of its logic is generally already resident in one form or another. Additionally, since this logic is primarily implemented in an application specific integrated circuit (ASIC) gate array, there is an abundant supply of design structure generally available at no extra cost.

The mini-cache provides for an "error word marking" function. As the four memory words A, B, C, D are received by the mini-cache $14_i$ on the system bus 22 they are checked for several possible error conditions as follows:

(i) Bus parity error; or, (ii) Word corruption error.

The word corruption error will be set by the system memory module 40 indicating that this particular word is corrupted. When either of these error conditions occur on the very first word received (the actual word requested by the processor 10), then system level error recovery procedures will be put into place. However, if an error condition is detected upon any of the "remaining" three words, that is to say the look-ahead words, then no system procedures are enacted but the mini-cache $14_i$ will mark this word as "corrupted" within the data queue block $26_q$.

On subsequent "Read" operations, if a word marked as "corrupted" is addressed as a mini-cache hit word, it is not sent back to the processor 10 even though it is a "hit" word. Instead this word is treated as a "miss" condition and thereafter a system memory "Read" is initiated on the bus while the mini-cache address is marked as invalid.

If it is assumed that a system memory "Read" operation (and the necessary system bus protocols) will consume 7 clock times, then the following Table I hereinbelow indicates the possible relative performance improvements for memory access of data to a processor. The left hand column indicates the description of the architectural configuration, the middle column shows the "average" access time for the processor to get a data word while the last column shows the percent improvement over a straight access to data from main memory.

TABLE I

| CONFIGURATION DESCRIPTION | ACCESS TIME AVERAGE TO PROCESSOR | % IMPROVEMENT OVER MAIN MEM |
| --- | --- | --- |
| MAIN MEMORY | 7 CLKS | 0% |
| GENERAL CACHE | 2.2 CLKS | 68% |
| GENERAL CACHE & | 1.4 CLKS | 79% |

TABLE I-continued

| CONFIGURATION DESCRIPTION | ACCESS TIME AVERAGE TO PROCESSOR | % IMPROVEMENT OVER MAIN MEM |
|---|---|---|
| MINI-CACHE MINI-CACHE ONLY | 3.2 CLKS | 53% |

The mini-cache architecture in FIG. 2 of the present system can be used either as an addition to a standard general cache memory structure or alternatively can be used in structures without the standard general cache memory module. Further under appropriate circumstances of the bus control used and with the proper design implementation, the mini-cache architecture may be almost free of added hardware material and costs.

Figure 2A:
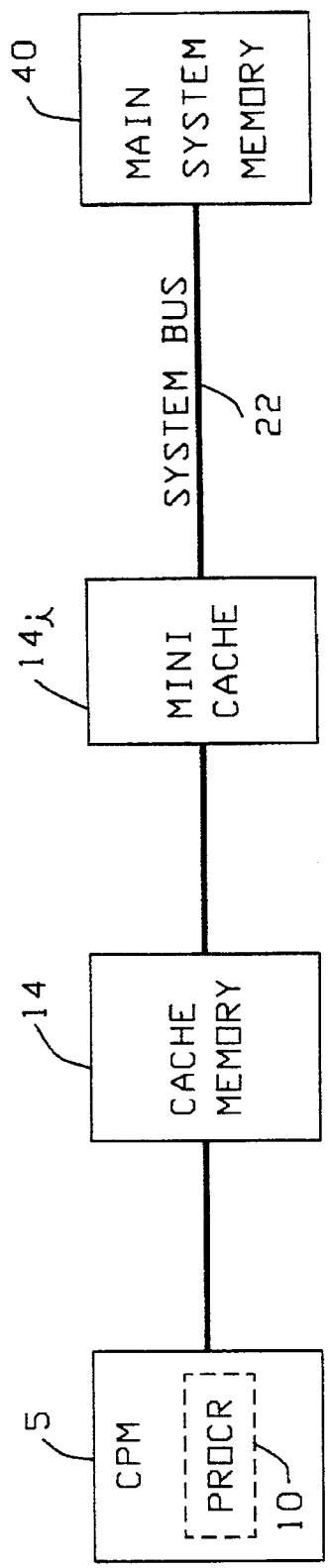
FIG. 2A is a diagram showing the use of the mini-cache with a general cache memory in the system.
Figure 2B:
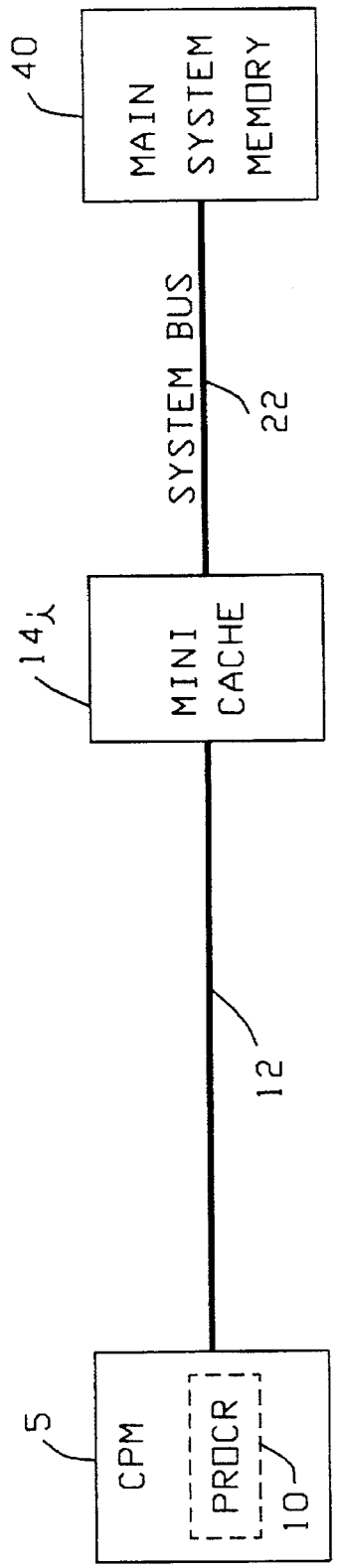
FIG. 2B is a drawing showing the exclusive use of a mini-cache in a computer system without the general cache memory.

FIG. 2B shows a system which exclusively uses only the mini-cache $14_i$ in the system without any general cache memory. Here the processor 10 communicates on an internal bus 12 to the mini-cache $14_i$ and communicates via the system bus 22 to the main system memory 40.

As seen in FIG. 2A, the mini-cache $14_i$ can be used as an enhancement to the general type of cache memory 14 so that the processor 10 will first communicate with the cache memory 14 after which it will communicate with the mini-cache $14_i$ and if neither of these two cache memories can fulfill the processor's data request, then, of course, the processor will use system bus 22 in order to access the main system memory 40.

Like the normal general cache memory, the mini-cache memory $14_i$ can provide to the processor 10 any required memory information without the need for system bus access when the required data is resident in the mini-cache memory. It may be noted that the normal or standard cache memory structures will reduce the memory access time for the processor up to 80 to 90% of the time involved in memory access requests. The addition of the mini-cache $14_i$ will then work on reducing the remaining 10%-20% of the memory access time required. Thus the mini-cache $14_i$ enhances the performance of the standard cache memory 14 additionally by accelerating the "fill time" of the caching operations.

For example in FIG. 2A, since the processor 10 in the central processing module 5 will be processing for several clock times (perhaps 5 clock times on the average) between executing memory accesses, this processing time provides a "window" for filling in the mini-cache $14_i$ behind the back of the processor while it is doing its normal processing functions. Thus the mini-cache can be loaded during this time without interfering with the processor 10.

Figure 5:
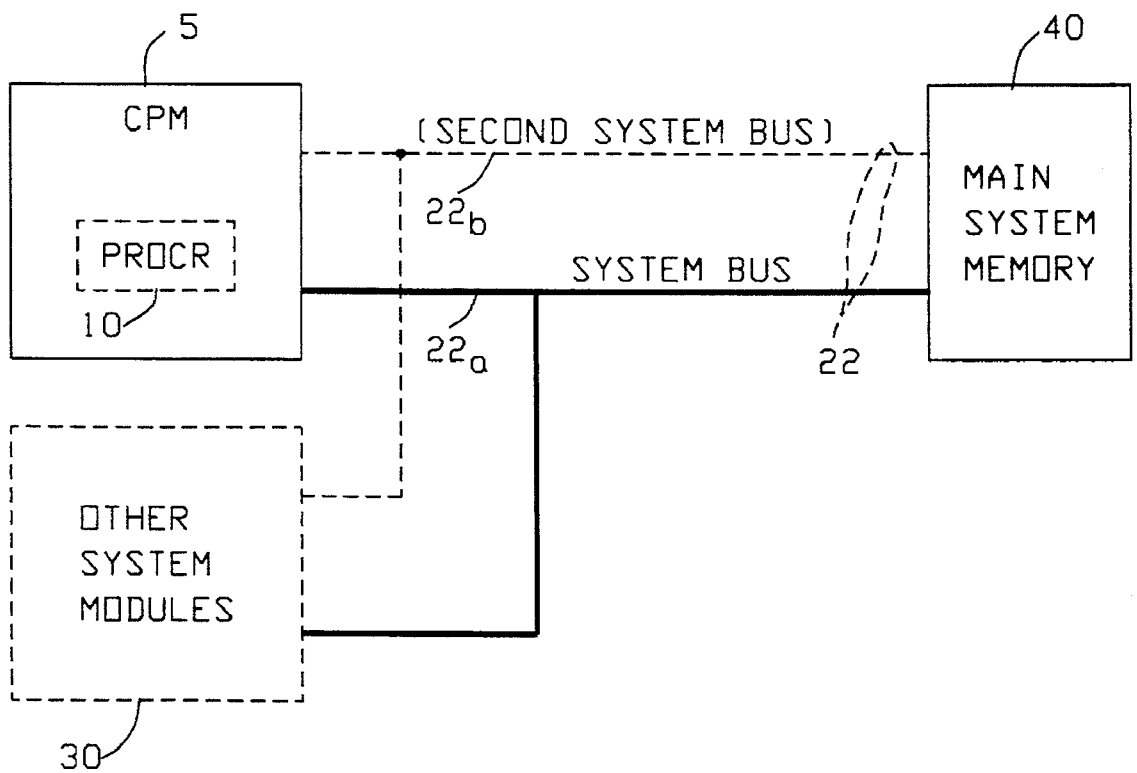
FIG. 5 is a generalized version of a computer system which may use a single bus for data transfer channels or may have a second system bus to provide for dual system bus operation.

Also, it may be noted that the system bus 22 shown in FIG. 2A, 2B and 5 are shared with other system modules, it may require several clock times on the average just to request system bus access, then to arbitrate the access to the bus and to be granted control of the bus (bus control). Thus once control of bus resources is gained, it is well to utilize each request for data access in the most efficient manner possible.

Figure 6:
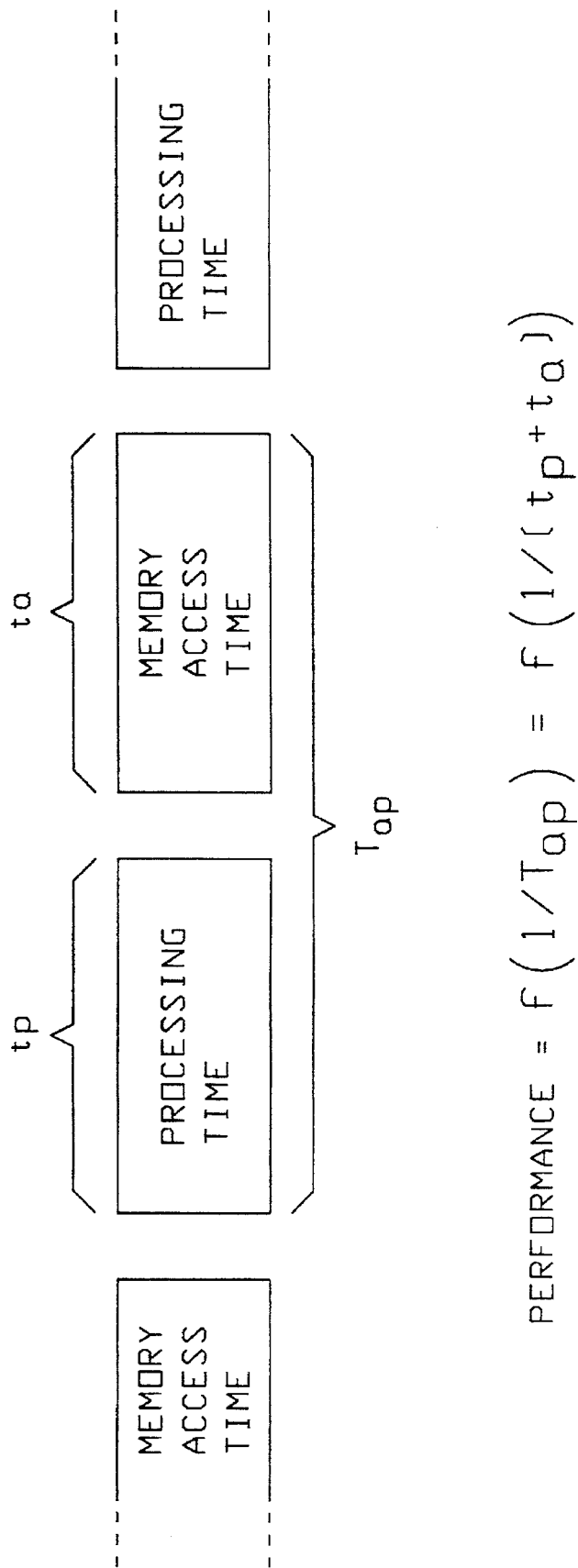
FIG. 6 is a drawing showing the timing factors involved for a processor to access main memory data.

During the processing time, $t_p$, (FIG. 6) and with the mini-cache memory $14_i$ being present and enabled, multiple memory words are accessed each time the system memory operation occurs. The bus protocol in the aforementioned A-11 computer system provides bus operators which will read the specifically requested memory word plus three other words (block of words) around the requested word. These words are provided immediately on the system bus 22 (one word per clock time) after the requested word.

Figure 3A:
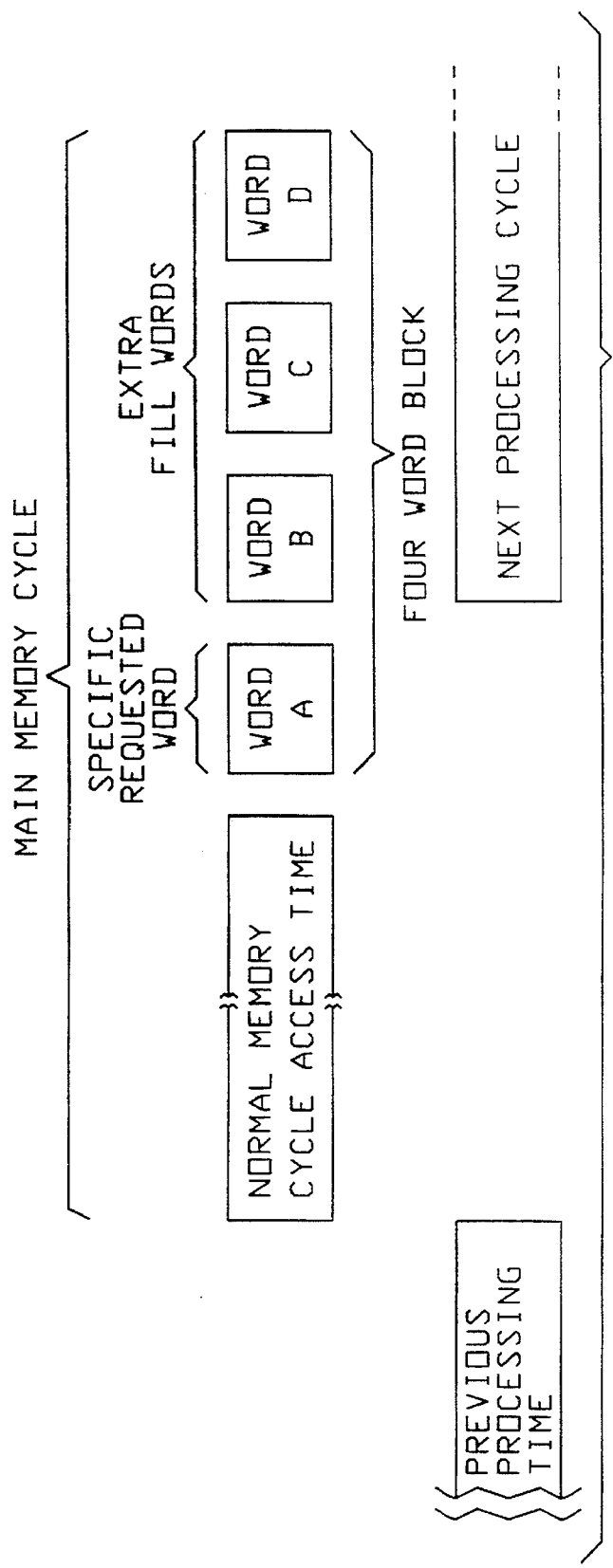
FIG. 3A is a drawing illustrating how a main memory cycle and a four word block is received from main memory.

The Mini-Cache $14_i$ immediately gives the requested word to the processor 10 and then stores the requested word plus the three extra words into the Data Queue $26_q$ of the mini-cache $14_i$. The address for this "block of words" is also held in the address register $26_a$ of the mini-cache for future "hit" comparison purposes. FIG. 3A shows the 4-word memory block on the system bus designated as word A, word B, word C, and word D. Whether the processor receives a single word (if the mini-cache $14_i$ is disabled or not present) or the 4-word block is received, the bus protocol in the presently described system requires the same number of clocks, except that there are specifically three additional clock times added to receive the three extra data words. However, these clock times are invisible to the processor 10. The memory block (containing the requested word) is always received with the specifically requested word first in line.

Thus in FIG. 3A it will be seen that during the main memory cycle and after the normal memory cycle access time, (the specific word requested being word A,) then word A is the first received word by the processor 10, but additionally on the next processing cycle, there are three clock times used in order to also receive word B, word C, and word D.

Figure 3B:
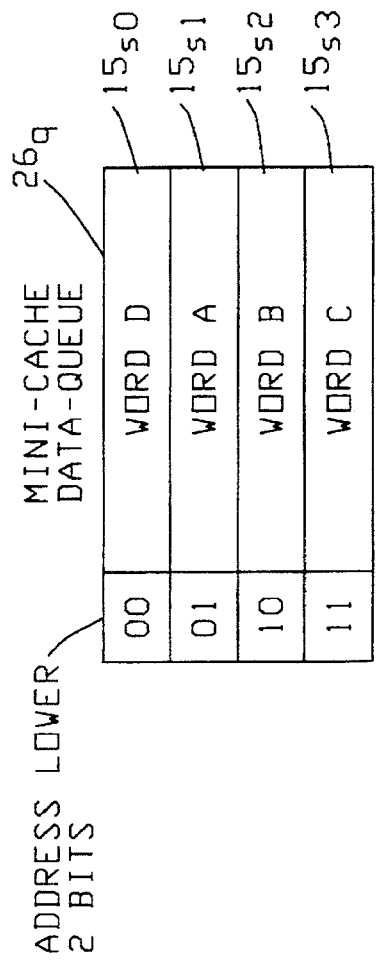
FIG. 3B illustrates the stacking of the four word block in the Data queue of the mini-cache module.
Figure 4:
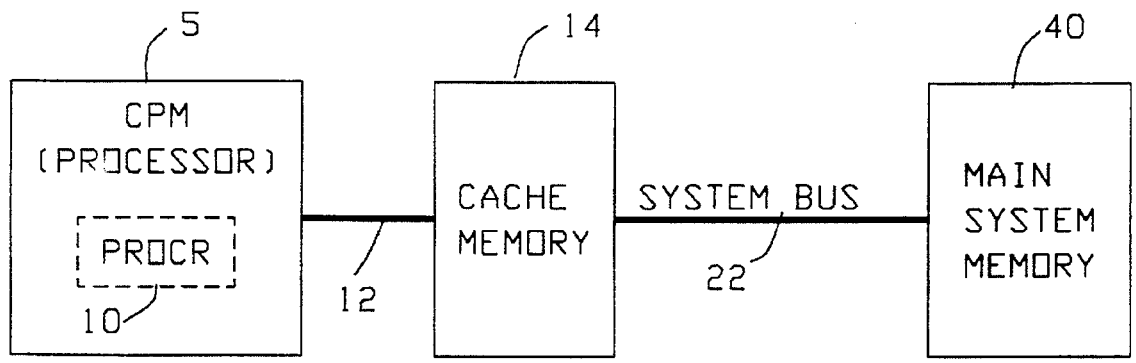
FIG. 4 is a drawing showing a commonly used architecture for a system with processor cache memory and main system memory.

As seen in FIG. 3B there are four data registers ($15_{sx}$) designated $15_{s0}$, $15_{s1}$, $15_{s2}$ and $15_{s3}$ which are used to store data words in blocks of four words in the data queue $26_q$ (of FIG. 2). Thus the data queue $26_q$ is seen in FIG. 3B holding the four word block received from main memory 40 as it is stored within the mini-cache $14_i$. The lower two bits, of the address lines, control which of the four storage registers (within the mini-cache) into which a word is to be placed and held. Thus if the lower address bits of the requested word are binary "00", then the word is held in the register $15_{s0}$. If the lowest address bits are binary "01", then the word will go to and reside in the register $15_{s1}$, etc.

The processor 10 may have requested a memory word of any value on the lower two bits. This word is received from the main memory 40 first and then transferred to the processor 10 for immediate processing as well as being stored in the appropriate mini-cache register of $14_i$.

The "add-ons" or the following three words which come immediately from the main memory 40 on the following three clocks, will then be a binary count of the lower two address bits.

If, for example, the requested memory word was addressed with the lowest 2 bits as "00", then the return order would be "00", "01", "10"and "11". This is a straight binary Mod 2 Count.

If, however, the requested word was addressed with the lowest two bits being "10", then the return order (to the processor) would be "10", "11", "00", and "01". Again this is a Mod 2 binary count.

These words are then stored in their appropriate Data Queue register $15_{sx}$ in the mini-cache $14_i$.

FIG. 3B shows an example where the original processor "Read" request was word "A" and this is placed at the lower address bits of "01", in the register $15_{s1}$. In this example, the remaining three words from the memory 40 were placed into the mini-cache $14_i$ and placed at the binary address positions "10" (Word B) at register $15_{s2}$, then address bits 11 (Word C) at register $15_{s3}$, and then (Word D) at address bits 00 in register $15_{s0}$.

Once the mini-cache $14_i$ has been filled from main memory 40 with a particular four word block, the block is marked as "valid" and the address of the currently stored block is held in an address module $26a$ in the mini-cache for future comparison when requests are made for data. The mini-cache address register, 26a, FIG. 2, holds all of the address bits for the data block involved except the two lower bits.

On the next and subsequent processor "Read" operations and before a system bus memory operation has begun, the "address requested" by the processor 10 is compared with the block addresses held in the mini-cache address register $26_a$. If a true comparison occurs, that is to say, the mini-cache has a "hit", then the particular appropriate word (of the four words held and stored) is transferred immediately to the processor 10 and no system bus operation is begun. System bus request is prevented by a signal on line $27_c$ from the hit control block 27 of FIG. 2 which prevents any system bus request to occur when a "hit" has occurred in the mini-cache $14_i$.

In the situation provided in FIG. 2A where a general cache memory structure is present in addition to the mini-cache structure, then the general cache memory 14 is always the first possible source of data to the processor 10. However, if the general cache memory 14 operates under a "miss" condition, that is to say it does not currently hold the requested memory address, then the mini-cache $14_i$ will be the next possible source of data access for the processor before any requirement is initiated to the system bus 22 to access the main system memory 40.

Throughout system operations, a memory block of four words is held in the Data Queue $26_q$ within the mini-cache registers $15_{sx}$ along with the block address which resides in the address register 26a of FIG. 2. Here the four-word block is marked "valid" until one of two possible actions occur:

(a) a "miss" occurs at the mini-cache $14_i$ for a requested processor memory Read. Under these conditions, a system main memory Read cycle will occur which re-fills the mini-cache $14_i$ with the new data from the new address. The "new" address block 26ais now marked as "Valid". While the mini-cache $14_i$ is being filled with the new data words the requested word is also sent to the processor 10.

(b) An "invalidation type" operation occurs at the address held in the mini-cache address register $26_a$.

Referring to FIG. 2 indicating the mini-cache $14_i$, the Steering Block 24 will be seen to connect to the general cache 14 or the processor interface. This interface receives signals from the processor 10 and the general cache memory 14 and will include the following signals:

PROCESSOR REQUEST ADDRESS:—used to compare address on bus with the address in register $26_a$ for possible mini-cache hits;

CMD-VALID:—indicates a valid address from the processor on bus $24_p$ and $14_p$.

CMD-TYPE:—indicates whether a valid Data-Read or a Code-Read from the processor is on bus $24_p$ and $14_p$.

CACHE-HIT:—indicates that the general cache memory 14 had a hit for this Read Operation.

Communication via bus $28_c$ to the Invalidation Block 28 from the system bus logic in interface 8 includes the following signals:

SA-Address-In:—is the input address on the system bus A (first system bus $22_a$).

A-Check-Address:—the system bus Address is active and has a valid-invalidation type operation.

SB-Address-In:—this is the same as the above signal except it is for the second system Bus $22_b$.

B-Check-Address:—this is the same valid-invalid operation as above but directed toward the second system Bus, $22_b$.

Mini-Cache-Hit:—this is the output from the mini-cache $14_i$ to inhibit system bus memory requests. It goes to the system bus controller, in interface 8.

The functional elements of the mini-cache $14_i$ may be summarized as follows:

Address Register Block $26_a$: (i) holds the current valid address blocks in the mini-cache; and, (ii) compares this address value against the incoming address values from the processor 10. A match or equality causes a mini-cache "hit" signal. This block holds a "VALID" flip-flop in 26a (FIG. 2) which when set "on" indicates the block address is valid. It is set "on" when mini-cache $14_i$ has its Data queue filled with a good block from memory 40. This flip-flop can be reset to INVALID by the Invalidation Block 28.

Invalidation Block 28: (i) compares the address on the system bus 22 (or busses) for "Write" Operations with addresses residing in the address register $26_a$; and, (ii) if an equality or match occurs, this block marks the address register $26_a$ as "invalid".

Hit Control Block 27: (i) provides the mini-cache "Hit" signal to a system bus controller in interface 8 to prevent system bus operation which might seek main memory access. The system bus interface 8 provides all the required bus protocols.

Queue Steering Block 24: (i) monitors the processor's Read requests, the general code hits, and the processor addresses; and, (ii) steers the appropriate register's $15_{sx}$ data (on a mini-cache hit signal) to the processor and the general cache memory, 14.

Maintenance Block 29: (i) allows all registers to be loaded (by shifting in) and Read (by shifting out) to the maintenance subsystem 50. Thus the entire mini-cache unit can be tested in this fashion. As seen in FIG. 2, this block connects to all the other block circuitry in the mini-cache $14_i$ to provide for testability and uses flip-flops (settable from the subsystem 50) to set the operational mode.

Figure 7:
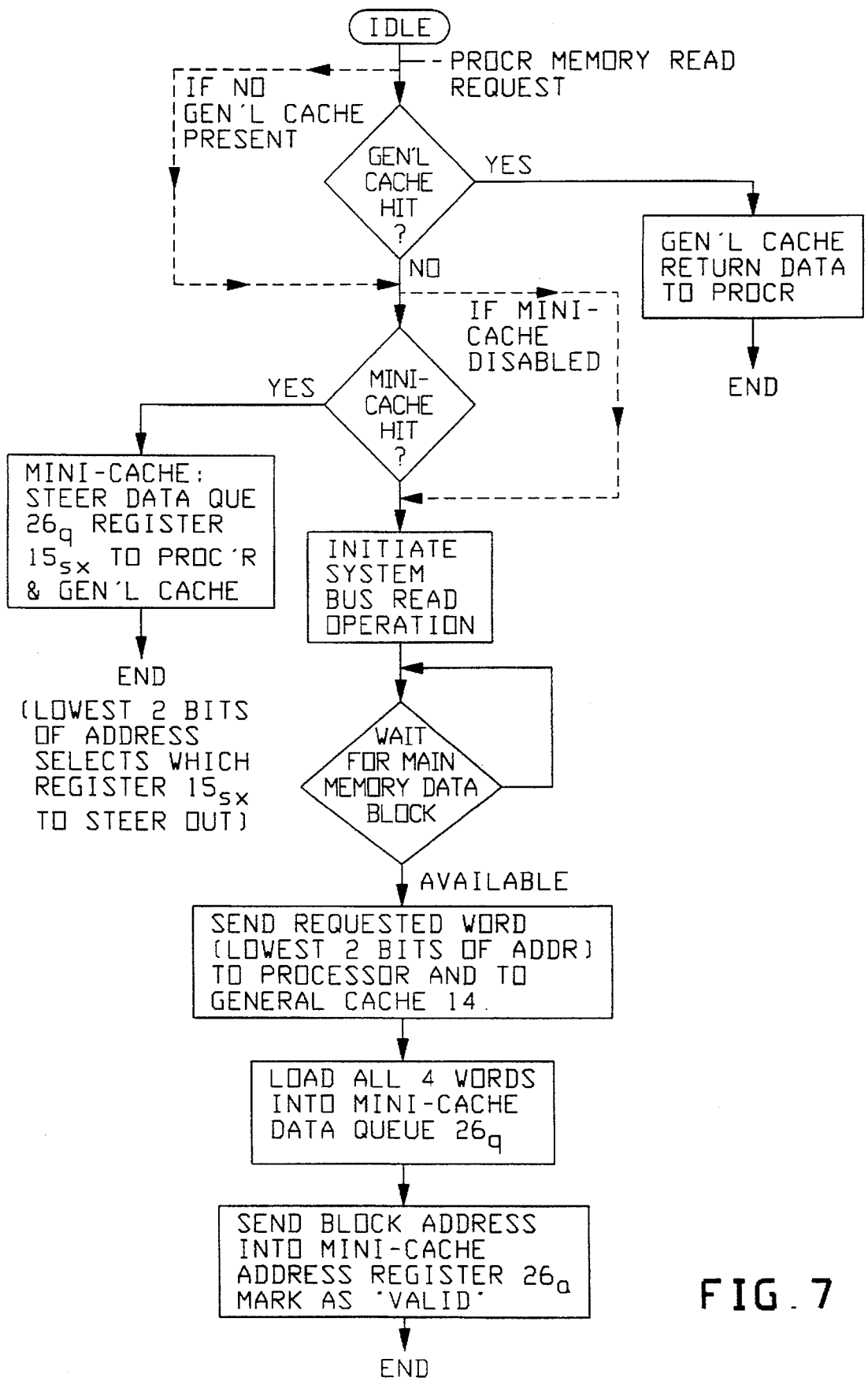
FIG. 7 is a flow chart illustrating the use of a mini-cache module in system operations.

Referring to FIG. 7, there is seen a flow chart illustrating the use of the mini-cache in a computer system operation.

In FIG. 7, starting from the "idle" condition, there occurs a processor memory Read request. A decision is made as to whether there is a general cache hit which, if indicated as "yes", the general cache memory unit 14 will return data to the processor 10 and that cycle will be terminated.

If there is no general cache hit, then the processor memory Read request is directed to the mini-cache $14_i$ to see whether a hit occurs there. If a hit has occurred, then the mini-cache unit $14_i$ will steer data from the appropriate data queue $26_q$ and the register $15_{sx}$ to the processor 10 and the general cache unit 14 at which time the Read request cycle will be terminated.

It may be noted that the lowest 2-bits of the address to the mini-cache will determine which register $15_{sx}$ data word (of the four data words) will be steered out.

If there is no mini-cache $14_i$ hit, then the system bus controller will initiate a system bus Read operation for the memory request. At this time, there is a wait for access to the main memory data block. When this becomes available the requested word will be sent to the processor 10 and to the general cache unit 14. This word resided at the lowest 2-bits of the requested address in the data queue block $26_q$.

Subsequently, all four words are loaded into the mini-cache data queue $26_q$.

After this, the command block address is fed into the mini-cache address register $26_a$ and is marked as "valid" after which the Read request cycle has now been ended.

Described herein has been an enhanced throughput computer-mini-cache system which can be functional on its own with a processor and main memory or which can be added to a general cache memory in a computer system in order to reduce the access time for processor-retrieval of memory data. The resulting improvement in processor performance enables substantially greater efficiency for computer system operations at very little cost in hardware or processing effort.

While the basic concept of the architecture and usage of the described computer system with auxiliary mini-cache has been indicated it should be understood that other implementations and configurations could be possible using the same concept and as defined in the following claims.

What is claimed is:

1. A computer system having a processor means connected to a bus interface unit holding a mini-cache means wherein said bus interface unit connects to a system bus means providing dual redundant busses to a main memory means, and said processor throughput is enhanced by a mini-cache means, said system comprising:

(a) a system bus means connecting a central processing module to said main memory means said system bus means including dual redundant busses;
   (b) said main memory means holding addressable locations for storing data words and instruction code words for said processor means;
   (c) a central processor means including:
      (c1) said processor means for requesting single memory words using a single memory word address and for executing single word code instructions using a single memory word code address;
      (c2) said mini-cache means for holding a block of multiple data words or block of multiple instruction code words and including:
         (i) steering block means for routing the addresses of a block of four words, to an internal address register means and for transferring said block of four words to a data queue means for storage during such time when said processor is executing processing instructions;
         (ii) said data queue means for storing said block of four words from main memory, said words including data words and instruction code words;
         (iii) said internal address register means for holding the said main memory address of each of said block of four words;
         (iv) means to compare a single word requested address from said processor with the addresses stored in said internal address register means and to generate a hit signal if a match occurs, for enabling a word transfer to said processor;
   (d) means for loading said mini-cache means with multiple data words or multiple instruction code words within one single memory-read request cycle by said processor means during any period that said processor means is executing normal operation cycles;
   (e) said bus interface unit connecting to said main memory via said system bus means including:
      (e1) means for transferring a four-word block of data words or instruction code words to said steering block means;
   (f) internal maintenance means for receiving control signals to configure the storage capability of said general cache memory and said auxiliary cache module so as to enable said auxiliary cache module to expand the storage capacity of said general cache memory or to disable said auxiliary cache module from expanding the storage capacity of said general cache memory, and including:
      (f1) means to enable said data queue means to respond only to Read data word commands only;
      (f2) means to enable said data queue means to respond only to Read instruction code word commands.

2. The system of claim 1 which includes:
   (a) one or more system resource modules connected to said system bus means, said system resource modules having capability of writing into said main memory means.

3. The system of claim 2 wherein said system resource modules include:
   (a) I/O controller means and/or auxiliary processor means contending for access to said system bus means.

4. The system of claim 1 wherein said processor means operates in multiple time periods for execution of instruction code words and wherein said mini-cache means is loaded with a said block of multiple data and/or instruction code words during the said any periods when said processor is executing instruction code words subsequent to having completed a single memory access read cycle.

5. The system of claim 1 wherein said mini-cache means includes:
   (a) monitoring means for sensing when said system bus means is carrying a Write command for a main memory address which matches the address held in said address register means;
   (b) means to generate and to store an invalid signal in said data queue means for a word whose address matches the address of said Write command.

6. A computer system providing enhanced memory access comprising:
   (a) processor means for executing instruction code words and processing information data words residing in a main memory means, and including:
      (a1) sequential request means for accessing single words of said data or code words from a cache memory means and including:
         (a1a) first sequence request means to address a general cache memory for requested code or data words;
         (a1b) second sequence request means to address an auxiliary mini-cache memory if said first sequence request results in a "miss";
         (a1c) third sequence request means to access a system bus means for transmission of said request to a main memory means if said second sequence request is a "miss";
   (b) said main memory means storing said instruction code words and said information data words at addressable locations residing therein;
   (c) said cache memory means including:
      (c1) said general cache memory for storing frequently used code and data words;
      (c2) said mini-cache memory for storing frequently used code and data words which have generally a lower usage than words stored in said general cache memory said mini-cache memory including:
         (i) data queue means for storing a block of multiple words which duplicate words in said main memory and including:
            (ia) data register means providing a data register for each one of said multiple words stored;
         (ii) address register means for listing the address of said block of words in said data queue means;
         (iii) comparison means for comparing said processor's request address with said address in said address register means to detect a match (hit) or a miss;

(iv) steering means for selecting the said data register word, corresponding to the request address which resulted in a hit, for transmission to said processor means;

(d) system bus means providing two parallel redundant busses for connecting said processor and main memory means via a bus interface Application Specific Integrated Circuit (ASIC);

(e) said bus interface ASIC enabling multiple word transfers from said main memory means to said mini-cache memory without inhibiting processor operations, and providing circuitry for said mini-cache memory with available surplus circuitry located within said ASIC.

7. The system of claim 6 wherein said computer system includes:

(a) maintenance logic means settable for:
 (i) taking said mini-cache off-line, or
 (ii) enabling said mini-cache to accept commands for reading only code words or only data words;
 (iii) disabling said mini-cache from accepting commands for reading code words or reading data words.

8. The system of claim 7 wherein said mini-cache memory further includes:

(a) monitor means for sensing whether said system bus means is carrying a Write command for a main memory address which matches an address held in said address register means;

(b) means to generate and to store an invalid signal in said data queue means for a word having the same main memory address as that on said system bus.

9. The system of claim 8 wherein said computer system further includes:

(a) maintenance logic means for selecting whether said mini-cache memory is to store instruction code words or information data words or a combination of both.

10. The system of claim 9 wherein said maintenance logic means includes:

(a) means to enable said mini-cache memory to go on-line with said general cache memory and processor means;

(b) means to disable and take off-line said mini-cache memory.

* * * * *